(12) United States Patent
Quinlan et al.

(10) Patent No.: US 7,024,601 B2
(45) Date of Patent: Apr. 4, 2006

(54) DVI LINK WITH CIRCUIT AND METHOD FOR TEST

(75) Inventors: Sion C. Quinlan, Oxon (GB); David J. Warner, Addlestone (GB)

(73) Assignee: Micron Technology, Inc., Boise, ID (US)

( * ) Notice: Subject to any disclaimer, the term of this patent is extended or adjusted under 35 U.S.C. 154(b) by 605 days.

(21) Appl. No.: 10/163,058

(22) Filed: Jun. 4, 2002

(65) Prior Publication Data

US 2003/0117960 A1    Jun. 26, 2003

(30) Foreign Application Priority Data

Dec. 17, 2001   (GB) ...................................... 0130201

(51) Int. Cl.
  *G01R 31/28* (2006.01)
(52) U.S. Cl. .................... 714/712; 714/715; 714/724
(58) Field of Classification Search ................ 714/712, 714/704, 738, 715, 799; 370/241
See application file for complete search history.

(56) References Cited

U.S. PATENT DOCUMENTS

| | | | |
|---|---|---|---|
| 3,956,601 A | | 5/1976 | Harris et al. |
| 4,701,916 A | | 10/1987 | Naven et al. .................. 371/15 |
| 5,274,445 A | * | 12/1993 | Overton et al. ............. 348/181 |
| 5,457,700 A | | 10/1995 | Merchant |
| 5,553,059 A | | 9/1996 | Emerson et al. |
| 5,761,216 A | | 6/1998 | Sotome et al. |
| 6,069,876 A | | 5/2000 | Lander et al. |
| 6,108,801 A | | 8/2000 | Malhotra et al. |
| 6,408,412 B1 | * | 6/2002 | Rajsuman ................... 714/724 |
| 2003/0070126 A1 | | 4/2003 | Werner et al. |

FOREIGN PATENT DOCUMENTS

| | | |
|---|---|---|
| EP | 0196152 | 10/1986 |
| WO | WO-01/73465 A1 | 10/2001 |

OTHER PUBLICATIONS

"Digital Visual Interface, Revision 1.0", *Digital Display Working Group*, (1999),pp. 1-76.

"DVI Test and Measurement Guide, Revision 1.0", *DDWG Electrical Test Working Group*, (2001),pp. 1-26.

* cited by examiner

*Primary Examiner*—Albert Decady
*Assistant Examiner*—Fritz Alphonse
(74) *Attorney, Agent, or Firm*—Schwegman, Lundberg, Woessner & Kluth, P.A.

(57) ABSTRACT

An embodiment includes encoding digital data into encoded digital data in a transition minimized differential signaling encoder, serializing the encoded digital data into encoded and serial digital data in a serializer, generating test data in a pseudo-random binary sequence generator circuit, transmitting the encoded and serial digital data through a multiplexer to a transmission medium in a normal mode of operation, and transmitting the test data through the multiplexer to the transmission medium in a test mode of operation. The encoder, the serializer, the sequence generator circuit, and the multiplexer may be fabricated in a single integrated circuit chip. The test data may be pseudo-random binary sequence data. The digital data may include data to generate colors in a visual image, and the encoded and serial digital data may be received, deserialized, decoded, and displayed in a display unit.

22 Claims, 6 Drawing Sheets

DVI LINK WITH CIRCUIT AND METHOD FOR TEST

CLAIM OF PRIORITY

This application claims priority under 35 U.S.C. 119 from British Application No. 0130201.7 filed Dec. 17, 2001, which application is incorporated herein by reference.

FIELD OF THE INVENTION

The present invention relates generally to digital visual interface links, and more particularly, to a digital visual interface link with a circuit and method for testing the link.

BACKGROUND

A digital visual interface (DVI) link is a high-speed digital connection to transmit digital visual information including data and/or instructions. The DVI link is used primarily to transmit digital visual information between a computing device and a display unit such as a monitor that displays the digital visual information. An advantage of the DVI link over analog links is that the digital visual information in the DVI link remains in the digital domain to substantially prevent losses of the information. The DVI link is useful in a wide range of computing and display units, and more than one DVI link may be used to increase bandwidth. Typically, the DVI link is implemented with two physical connectors, one that is only digital and the other having both analog and digital components. The computing device and the display unit each have a connector, and a transmission medium such as a cable is connected between the connectors to carry the digital visual information. The digital visual information is transmitted serially.

A DVI link is tested in a test mode with a Bit Error Rate Testing (BERT) method, and during the test mode a defined pseudo-random binary sequence (PRBS) pattern of data is generated and transmitted over the DVI link. Data is received from the DVI link and a bit error rate (BER) is determined for the DVI link by comparing the data received with the PRBS pattern. One problem with the BERT method of testing the DVI link is that the PRBS pattern is incompatible with encoded digital visual information that is transmitted over the DVI link during its normal operation. The incompatibility makes the test mode of the DVI link difficult and cumbersome.

There remains a need for a method of testing a DVI link, or a circuit for testing the DVI link, which is efficient and convenient and substantially overcomes the incompatibility between a PRBS pattern used to test the DVI link and digital visual information that is transmitted over the DVI link during its normal operation.

SUMMARY OF THE INVENTION

The above mentioned and other needs are addressed in the following detailed description. According to one embodiment of the present invention a method includes encoding digital data into encoded digital data in a transition minimized differential signaling encoder and serializing the encoded digital data into encoded and serial digital data in a serializer. The method further includes generating test data in a pseudo-random binary sequence generator circuit, transmitting the encoded and serial digital data through a multiplexer to a transmission medium in a normal mode of operation, and transmitting the test data through the multiplexer to the transmission medium in a test mode of operation. The test mode of operation may be selected by a test signal coupled to the multiplexer. The encoder, the serializer, the sequence generator circuit, and the multiplexer may be fabricated in a single integrated circuit chip. The test data may be pseudo-random binary sequence data that repeats every $2^{23}-1$ clock cycles generated in a pseudo-random binary sequence generator circuit including twenty three clocked D-type flip flops coupled in series. The digital data may include data to generate colors in a visual image, and the encoded and serial digital data may be received, deserialized, decoded, and displayed in a display unit. The transmission medium may be copper cables, optical fibers, or fiber optic cables. The encoded and serial digital data or the test data may be transmitted as a differential signal over the transmission medium.

Advantages of the present invention will be apparent to one skilled in the art upon an examination of the detailed description.

DETAILED DESCRIPTION

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the claims.

In this description a digital signal of 1 may also be called a high signal and a digital signal of 0 may also be called a low signal. In this description, unless otherwise specified, a line comprises a transmission medium capable of transmitting a signal. For example, the line may comprise a conductive wire such as a copper cable, or an optical fiber.

Figure 1:
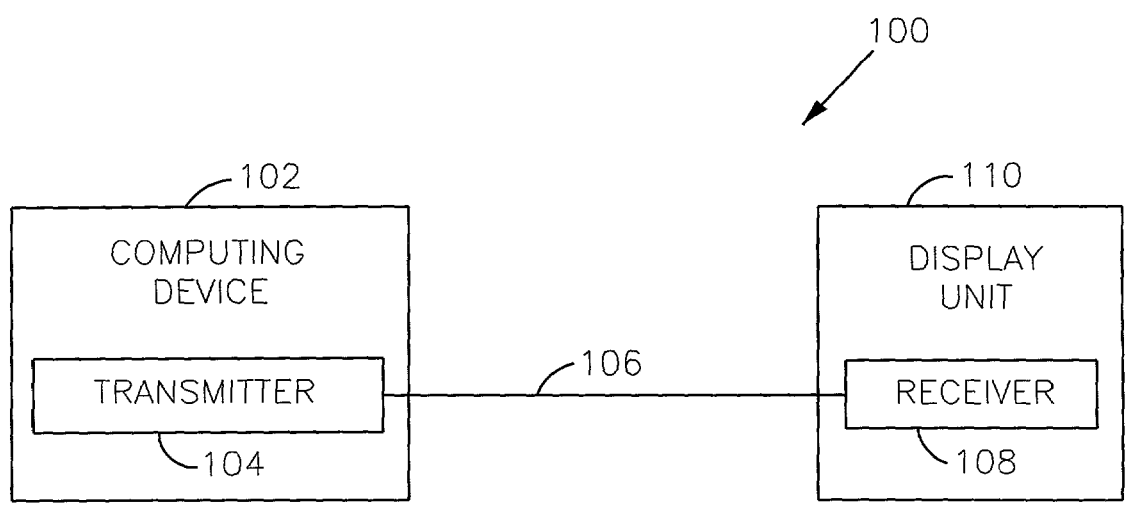
FIG. 1 is a block diagram of an information-handling system according to an embodiment of the present invention.

A block diagram of an information-handling system 100 is shown in FIG. 1 according to an embodiment of the present invention. The system 100 includes a computing device 102 having a digital visual interface (DVI) transmitter 104 circuit to transmit digital visual information including data and/or instructions. The DVI transmitter 104 transmits the digital visual information serially over a transmission medium 106. Digital visual information will also be referred to as digital data in this description for purposes of brevity. A digital visual interface (DVI) receiver 108 circuit in a display unit 110 is coupled to receive the digital visual information from the transmission medium 106. The digital visual information is displayed as a visual image in the display unit 110. The transmission medium 106 may comprise one or more conductive wires such as copper cables, or one or more optical fibers, or one or more fiber optic cables. The DVI transmitter 104, the transmission medium 106, and the DVI receiver 108 comprise a digital visual interface (DVI) link according to an embodiment of the present invention. The DVI link may also be identified more generally as an information transmission link or a communications link.

The computing device 102 may comprise a workstation, a desktop computer, a laptop computer, a network computer (NC), a hand-held computer, a personal computer, or a multiprocessor supercomputer. The display unit 110 may be any device known to those skilled in the art that can display the digital visual information and may comprise a cathode ray tube (CRT), a flat panel display such as a liquid crystal display (LCD), or a television such as a high definition television (HDTV).

The system 100 including both the computing device 102 and the display unit 110 may comprise a workstation, a desktop computer, a laptop computer, a network computer (NC), a hand-held computer, a personal computer, a multiprocessor supercomputer, a video game, a hand-held calculator, a television set-top box, a fixed-screen telephone, a smart mobile phone, or a personal digital assistant (PDA), an information appliance such as, for example, a cellular telephone or any wireless device, a pager, a daily planner or organizer, an information component such as, for example, a magnetic disk drive or telecommunications modem, or other appliance such as, for example, a washing machine or a microwave oven having an electronic controller.

Figure 2:
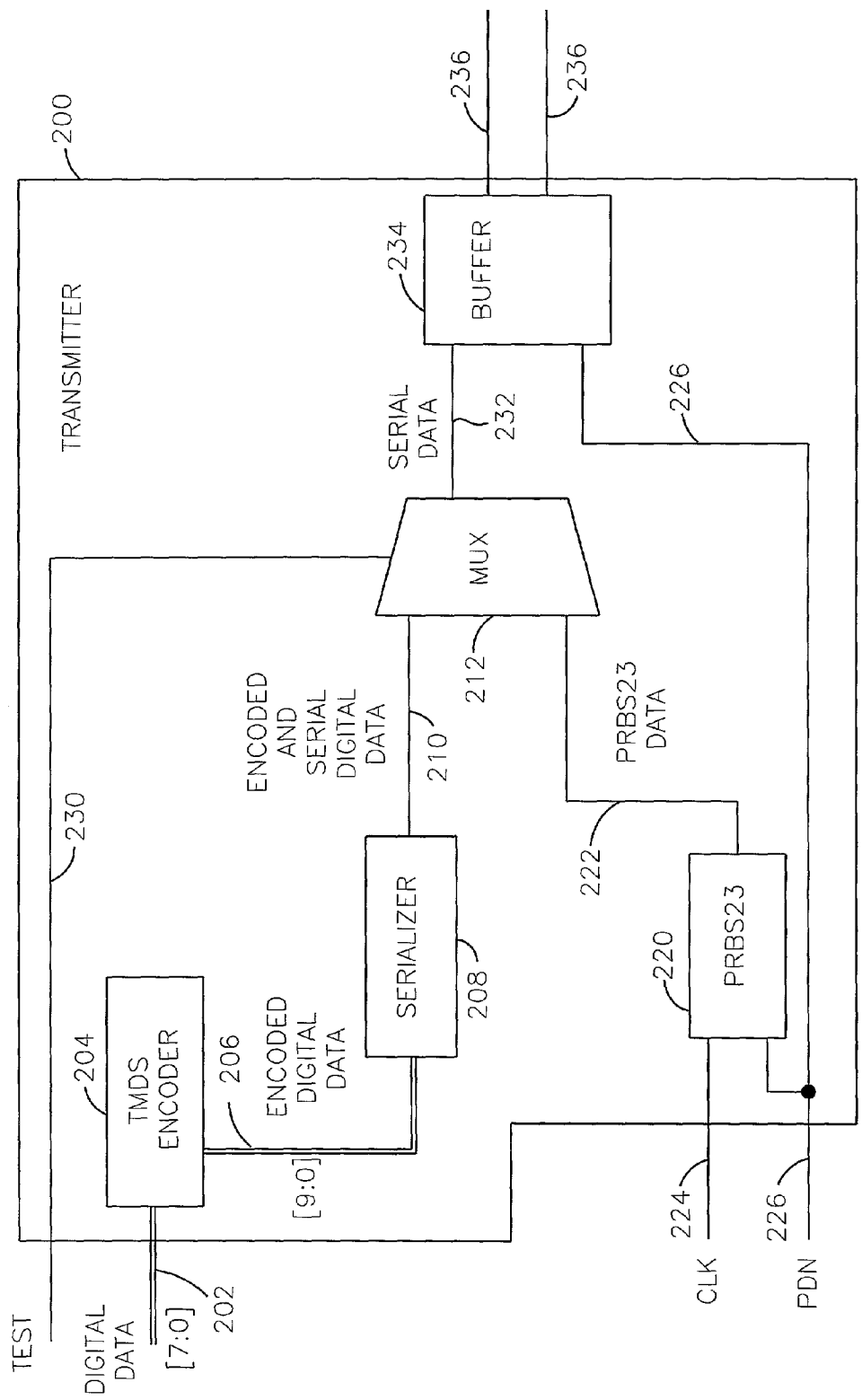
FIG. 2 is a block diagram of a digital visual interface transmitter circuit according to an embodiment of the present invention.

A block diagram of a digital visual interface (DVI) transmitter 200 circuit is shown in FIG. 2 according to an embodiment of the present invention. The DVI transmitter 200 may comprise the DVI transmitter 104 shown in FIG. 1. The DVI transmitter 200 is coupled to receive digital data from a plurality of parallel lines [7:0] 202 that are coupled to a transition minimized differential signaling (TMDS) encoder 204. The TMDS encoder 204 is a type of encoder known to those skilled in the art. The digital data comprise 8 digital signals transmitted in parallel representing an 8 bit code, and may comprise more or less digital signals according to alternate embodiments of the present invention. The TMDS encoder 204 encodes the digital data into encoded digital data comprising 10 digital signals that represents a 10 bit code and is suitable for transmission over the transmission medium 106 shown in FIG. 1. The encoded digital data is transmitted over a set of parallel lines [9:0] 206 coupled between the TMDS encoder 204 and a serializer 208. The serializer 208 is a type of serializer known to those skilled in the art. The serializer 208 receives and serializes the encoded digital data into encoded and serial digital data to be transmitted in serial form over a line 210 coupled between the serializer 208 and a multiplexer 212. The multiplexer 212 is a type of multiplexer known to those skilled in the art.

Pseudo-random binary sequence (PRBS) data is generated in a pseudo-random binary sequence (PRBS) generator circuit, and in particular a PRBS23 generator 220 circuit. The PRBS23 generator 220 generates PRBS23 data that is transmitted in a serial fashion over a line 222 coupled between the PRBS23 generator 220 and the multiplexer 212. The PRBS23 generator 220 is coupled to receive a clock (CLK) signal on a line 224 and a power-down (PDN) signal on a line 226. The PDN signal initializes the PRBS23 generator 220. A test signal (TEST) is coupled to the multiplexer 212 through a line 230 to change the state of the multiplexer 212 to start or end a test mode of operation. The multiplexer 212 transmits serial data to a line 232 coupled between the multiplexer 212 and a buffer 234 circuit. The buffer 234 is a type of buffer known to those skilled in the art. The buffer 234 converts the serial data into a differential signal that is transmitted over a pair of differential lines 236 coupled to the buffer 234. The buffer 234 is also coupled to receive the PDN signal from the line 226. The differential lines 236 may comprise the transmission medium 106 and may be coupled to the DVI receiver 108 in the display unit 110 shown in FIG. 1. In one embodiment of the present invention, the DVI transmitter 200 including all of its elements is in a single integrated circuit chip, and is fabricated as a single integrated circuit chip that may or may not include other circuits.

The DVI transmitter 200 operates in the following manner. During a normal, non-test mode of operation, the encoded and serial digital data is passed through the multiplexer 212 in serial form to the buffer 234. The buffer 234 converts the encoded and serial digital data into a differential signal to be transmitted over the differential lines 236. The DVI link is tested in a test mode of operation during which the multiplexer 212 is switched by the TEST signal on the line 230. During the test mode, PRBS23 data is generated in the PRBS23 generator 220 and the multiplexer 212 is configured by the TEST signal to transmit the PRBS23 data in serial form to the buffer 234. The buffer 234 converts the PRBS23 data into a differential signal that is transmitted over the differential lines 236 to test the DVI link in the information-handling system 100.

An advantage of the DVI transmitter 200 is that the PRBS23 data is not passed through the TMDS encoder 204 or the serializer 208, and thus the test of the DVI link is not complicated by such a transformation of the PRBS23 data. The PRBS23 data is generated in the PRBS23 generator 220 separate from the circuits that modify the digital data.

Figure 3:
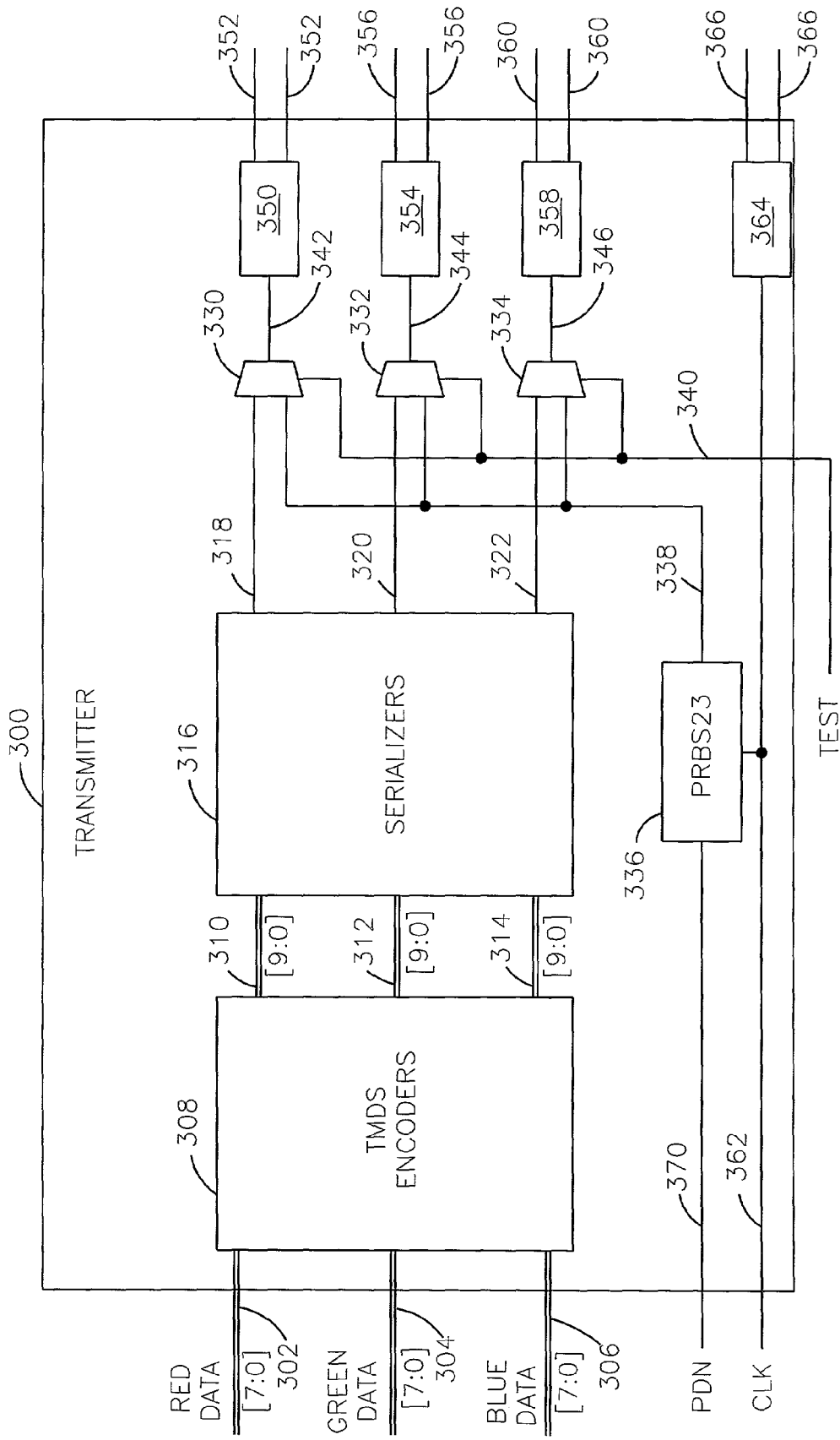
FIG. 3 is a block diagram of a digital visual interface transmitter circuit according to an embodiment of the present invention.

A block diagram of a digital visual interface (DVI) transmitter 300 circuit is shown in FIG. 3 according to an embodiment of the present invention. The DVI transmitter 300 may comprise the DVI transmitter 104 shown in FIG. 1. The DVI transmitter 300 is coupled to receive digital red data, digital green data, and digital blue data representing digital visual information. The digital red data is to be coupled to a display unit to generate red color in a visual image, the digital green data is to be coupled to the display unit to generate green color in the visual image, and the digital blue data is to be coupled to the display unit to generate blue color in the visual image. The visual image is displayed by the display unit. Each of the red data, the green data, and the blue data comprise 8 digital signals representing an 8 bit code transmitted in parallel and may comprise more or less digital signals according to alternate embodiments of the present invention. The red data is received from a plurality of parallel lines [7:0] 302, the green data is received from a plurality of parallel lines [7:0] 304, and the blue data is received from a plurality of parallel lines [7:0]

306. The lines 302, 304, and 306 are coupled to a plurality of transition minimized differential signaling (TMDS) encoders 308. The TMDS encoders 308 are comprised of a type of encoder known to those skilled in the art. The TMDS encoders 308 encode the red data, the green data, and the blue data into encoded red data, encoded green data, and encoded blue data that is digital and suitable for transmission over the transmission medium 106 shown in FIG. 1. The encoded red data, the encoded green data, and the encoded blue data each comprise 10 digital signals representing a 10 bit code, and each are transmitted over three respective sets of parallel lines [9:0] 310, 312, and 314 coupled between the TMDS encoders 308 and a plurality of serializers 316. The serializers 316 are each comprised of a type of serializer known to those skilled in the art. The serializers 316 receive and serialize the encoded red data, the encoded green data, and the encoded blue data to be transmitted in serial form over three respective lines 318, 320, and 322. The line 318 is coupled to transmit encoded and serial red data between the serializers 316 and a first multiplexer 330. The line 320 is coupled to transmit encoded and serial green data between the serializers 316 and a second multiplexer 332. The line 322 is coupled to transmit encoded and serial blue data between the serializers 316 and a third multiplexer 334. Each of the multiplexers 330, 332, and 334 is a type of multiplexer known to those skilled in the art.

Pseudo-random binary sequence (PRBS) data is generated in a pseudo-random binary sequence (PRBS) generator circuit, and in particular a PRBS23 generator 336 circuit. The PRBS23 generator 336 generates PRBS23 data that is transmitted in a serial fashion over a line 338 coupled between the PRBS23 generator 336 and each of the multiplexers 330, 332, and 334. A test signal TEST is coupled to each of the multiplexers 330, 332, and 334 over a line 340 to change the state of the multiplexers 330, 332, and 334 during a test mode of operation as will be explained hereinbelow.

The first multiplexer 330 transmits first serial data to a first line 342 coupled between the first multiplexer 330 and a first buffer 350 circuit. The first buffer 350 converts the first serial data into a first differential signal that is transmitted over a first pair of differential lines 352 coupled to the first buffer 350. The second multiplexer 332 transmits second serial data to a second line 344 coupled between the second multiplexer 332 and a second buffer 354 circuit. The second buffer 354 converts the second serial data into a second differential signal that is transmitted over a second pair of differential lines 356 coupled to the second buffer 354. The third multiplexer 334 transmits third serial data to a third line 346 coupled between the third multiplexer 334 and a third buffer 358 circuit. The third buffer 358 converts the third serial data into a third differential signal that is transmitted over a third pair of differential lines 360 coupled to the third buffer 358. The first, second, and third differential lines 352, 356, and 360 may comprise the transmission medium 106 and may be coupled to the DVI receiver 108 in the display unit 110 shown in FIG. 1. A clock signal CLK is coupled to a line 362 in the DVI transmitter 300 that is coupled through to a fourth buffer 364 circuit. The fourth buffer 364 converts the CLK signal into a differential clock signal that is transmitted over a fourth pair of differential lines 366 coupled to the fourth buffer 364. The CLK signal is coupled to the PRBS23 generator 336 through the line 362, and a power-down (PDN) signal is coupled to the PRBS23 generator 336 on a line 370.

In one embodiment of the present invention, the DVI transmitter 300 including all of its elements is in a single integrated circuit chip, and is fabricated as a single integrated circuit chip that may or may not include other circuits.

The DVI transmitter 300 operates in the following manner. During a normal, non-test mode of operation the encoded and serial red data, the encoded and serial green data, and the encoded and serial blue data is passed through the respective multiplexers 330, 332, and 334 in serial form to the respective buffers 350, 354, and 358. The buffers 350, 354, and 358 convert this data into differential signals to be transmitted over the differential lines 352, 356, and 360. The DVI link is tested in a test mode of operation during which the multiplexers 330, 332, and 334 are switched by the TEST signal on the line 340. During the test mode, PRBS23 data is generated in the PRBS23 generator 336 and the multiplexers 330, 332, and 334 are configured by the TEST signal to transmit the PRBS23 data in serial form to the buffers 350, 354, and 358. The buffers 350, 354, and 358 convert the PRBS23 data into differential signals that are transmitted over the differential lines 352, 356, and 360 to test the DVI link in the information-handling system 100.

Figure 4:
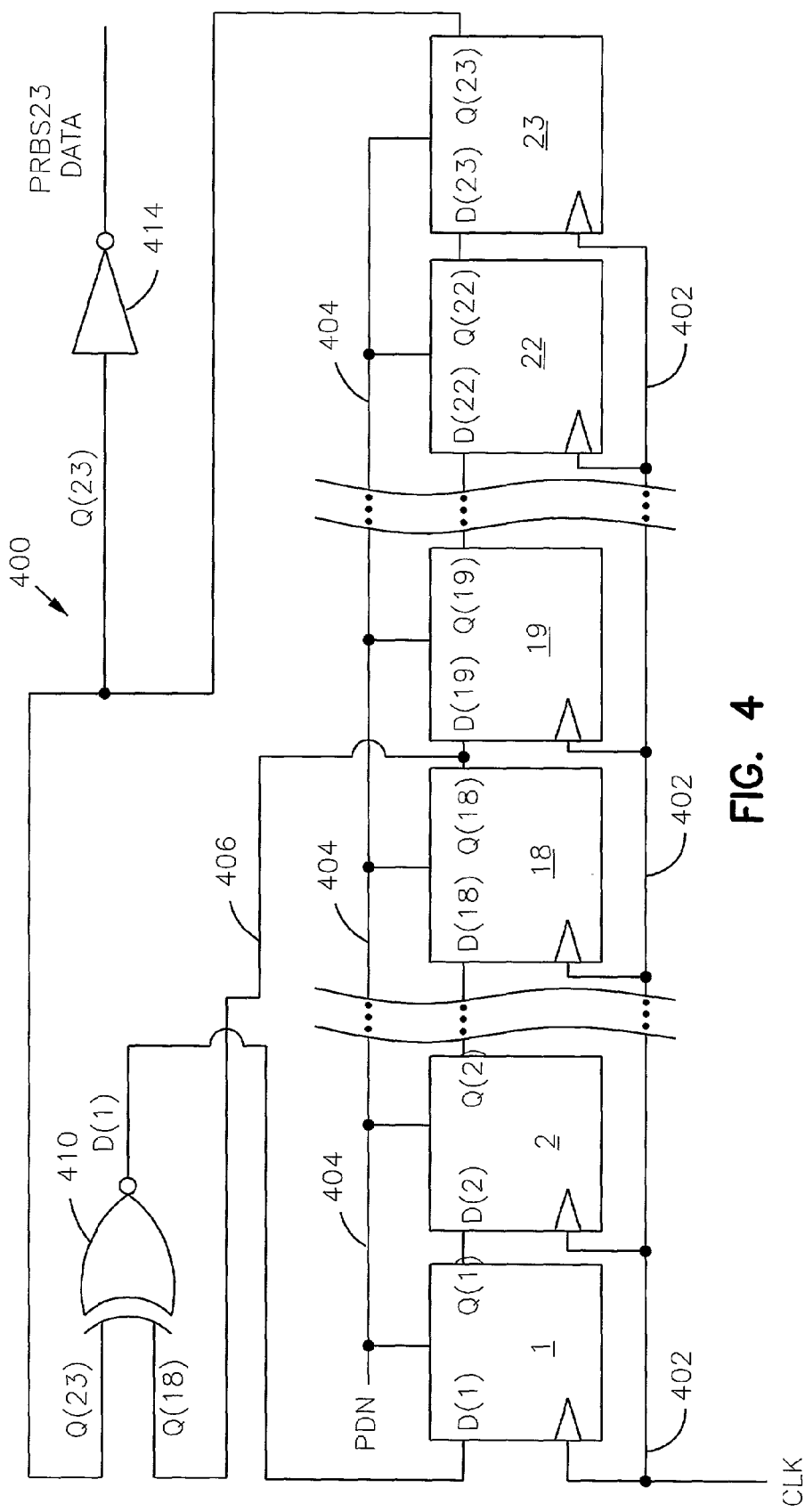
FIG. 4 is a block diagram of a pseudo-random binary sequence data generator circuit according to an embodiment of the present invention.

A block diagram of a pseudo-random binary sequence (PRBS) generator circuit, and in particular a PRBS23 generator 400 circuit, is shown in FIG. 4 according to an embodiment of the present invention. The PRBS23 generator 400 may comprise the PRBS23 generator 220 shown in FIG. 2, or the PRBS23 generator 336 shown in FIG. 3. The PRBS23 generator 400 is a linear feedback shift register (LFSR) that generates pseudo-random binary sequence (PRBS) data, and specifically PRBS23 data that repeats every $2^{23}-1$ clock cycles. The PRBS23 generator 400 comprises twenty three clocked D-type flip flops 1–23 coupled in series, each of the D-type flip flops 1–23 being standard and known to those skilled in the art. Each of the D-type flip flops 1–23 has a D input and a Q output. Each of the D-type flip flops 1–23 also has inputs coupled to receive the clock (CLK) signal on a line 402 and the power-down (PDN) signal on a line 404. The CLK signal and the PDN signal were both shown and described with reference to FIGS. 2 and 3. Each of the D-type flip flops 1–23 is triggered to change state by a transition in the CLK signal, and each is initialized or cleared by the PDN signal.

Six of the D-type flip flops 1–23 are shown in FIG. 4, including D-type flip flops 1, 2, 18, 19, 22, and 23. The other D-type flip flops 3–17, 20, and 21 in the PRBS23 generator 400 are not shown for purposes of brevity. Each of the first twenty two of the D-type flip flops 1–22, including the D-type flip flops 1, 2, 18, 19, and 22 shown in FIG. 4, have a Q output coupled to a D input of the next D-type flip flop. For example, the D-type flip flop 1 has an output Q(1) coupled to an input D(2) of the D-type flip flop 2. The D-type flip flop 18 has an output Q(18) coupled to an input D(19) of the D-type flip flop 19. Similarly, the D-type flip flop 22 has an output Q(22) coupled to an input D(23) of the D-type flip flop 23.

Feedback is provided in the PRBS23 generator 400 by an exclusive-NOR gate (XNOR) gate 410 having a first input coupled to the output Q(18) of the D-type flip flop 18 and a second input coupled to the output Q(23) of the D-type flip flop 23. An output of the XNOR gate 410 is coupled to the input D(1) of the D-type flip flop 1 such that the PRBS23 generator 400 can generate the PRBS23 data at the output Q(23) of the D-type flip flop 23 in response to pulses of the CLK signal. The PRBS23 data is generated as long as the first input and the second input of the XNOR gate 410 are coupled to respective Q outputs of D-type flip flops that are separated by four (4) other D-type flip flops. For example, the PRBS23 generator 400 can generate the PRBS23 data if the first input of the XNOR gate 410 is coupled to the output Q(1) of the D-type flip flop 1 and the second input of the XNOR gate 410 is coupled to an output Q(6) of the D-type flip flop 6 that is not shown for purposes of brevity. The PRBS23 data is buffered by an inverter 414 having an input coupled to the output Q(23) of the D-type flip flop 23 and an output. The output of the inverter 414 may be coupled to the multiplexer 212 shown in FIG. 2 or the multiplexers 330, 332, and 334 shown in FIG. 3 according to alternate embodiments of the present invention.

The PRBS23 generator 400 is fabricated in the DVI transmitter 200 shown in FIG. 2 in a single integrated circuit chip, or in the DVI transmitter 300 shown in FIG. 3 in a single integrated circuit chip, according to alternate embodiments of the present invention.

Figure 5:
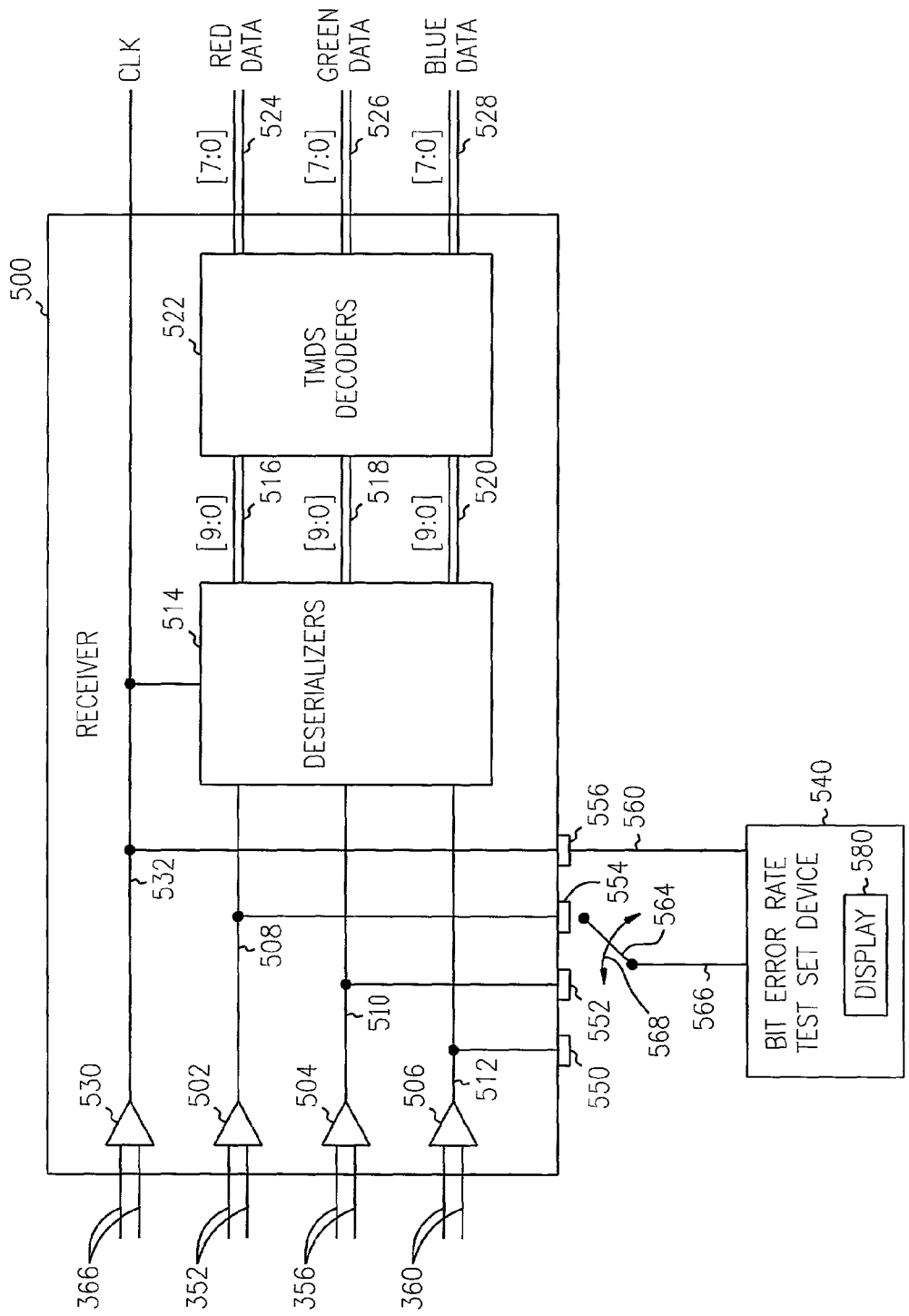
FIG. 5 is a block diagram of a digital visual interface receiver circuit according to an embodiment of the present invention.

A block diagram of a digital visual interface (DVI) receiver 500 circuit is shown in FIG. 5 according to an embodiment of the present invention. The DVI receiver 500 may comprise the DVI receiver 108 shown in FIG. 1. The DVI receiver 500 is coupled to receive the encoded and serial red data, the encoded and serial green data, and the encoded and serial blue data as differential signals from the differential lines 352, 356, and 360. Each differential signal is coupled to one of three differential line receivers 502, 504, and 506 in the DVI receiver 500 to convert the differential signal into a single-ended signal on one of three respective lines 508, 510, and 512. The encoded and serial red data, the encoded and serial green data, and the encoded and serial blue data are then coupled as single-ended signals to a plurality of deserializers 514 through the lines 508, 510, and 512 to be deserialized. The deserializers 514 generate encoded red data, encoded green data, and encoded blue data, each comprising 10 digital signals representing a 10 bit code transmitted in parallel over one of three respective sets of parallel lines [9:0] 516, 518, and 520. There may be more or less parallel lines according to alternate embodiments of the present invention. The lines 516, 518, and 520 are coupled between the deserializers 514 and a plurality of transition minimized differential signaling (TMDS) decoders 522. The deserializers 514 are comprised of a type of deserializer known to those skilled in the art, and the TMDS decoders 522 are comprised of a type of decoder known to those skilled in the art. The TMDS decoders 522 decode the encoded red data, the encoded green data, and the encoded blue data into red data, green data, and blue data suitable for use to generate a visual image in the display unit 110 shown in FIG. 1. The red data, green data, and blue data each comprise 8 digital signals representing an 8 bit code transmitted in parallel over one of three respective sets of parallel lines [7:0] 524, 526, and 528 to the display unit 110. The differential clock signal on the differential lines 366 is coupled to a differential line receiver 530 in the DVI receiver 500 that converts the differential clock signal back into the clock signal CLK on a line 532. The line 532 couples the clock signal CLK to the deserializers 514. The differential line receivers 502, 504, 506, and 530 are each comprised of a type of differential line receiver known to those skilled in the art.

The DVI link is tested in the test mode of operation described above during which PRBS23 data is generated and transmitted over the differential lines 352, 356, and 360 to the DVI receiver 500. The DVI link is tested by analyzing the data received by the DVI receiver 500 in a bit error rate test set device 540. The test set device 540 is coupled to receive serial data from one of the lines 508, 510, and 512 through one of three respective external terminals 550, 552, and 554 on the DVI receiver 500. The line 532 is coupled to a fourth external terminal 556 to supply the clock signal CLK.

The test set device 540 is coupled to the fourth external terminal 556 through a line 560 to receive the clock signal CLK from the DVI receiver 500, and is coupled through a 3-way mechanical switch 564 to one of the external terminals 550, 552, and 554. The switch 564 may be moved manually by a user in a reversible direction 568 to be coupled to one of the external terminals 550, 552, and 554. The test set device 540 may also be coupled to one of the external terminals 550, 552, and 554 by a flying lead according to an alternate embodiment of the present invention.

The DVI link is tested in the following manner. The PRBS23 data is generated and transmitted as differential signals over the differential lines 352, 356, and 360 to the DVI receiver 500. The differential signals are each coupled to one of the differential line receivers 502, 504, and 506 to convert the differential signals into single-ended signals on the respective lines 508, 510, and 512. One of the single-ended signals is coupled to the test set device 540 through the switch 564, and the test set device 540 analyzes the single-ended signal along with the clock signal CLK from the DVI receiver 500 to determine if there was any corruption of the data transmitted over the differential lines 352, 356, and 360. The position of the switch 564 indicates the differential lines 352, 356, and 360 being tested. Results of the test are displayed on a display 580 in the test set device 540.

The differential lines 352, 356, 360, and 366 shown in FIGS. 3 and 5 may comprise the transmission medium 106 shown in FIG. 1. Each of the pairs of differential lines 352, 356, 360, and 366 may be referred to as a channel.

The embodiments of the present invention shown in FIGS. 1–5 and described above are capable of testing a digital visual interface (DVI) link in an efficient and convenient manner. The embodiments of the present invention shown in FIGS. 1–5 and described above include encoders and serializers coupled to one or more multiplexers in parallel with a pseudo-random binary sequence (PRBS) generator circuit. The encoders and serializers may encode and serialize digital visual information that is transmitted over the DVI link during a normal operation of the DVI link. The PRBS generator may generate pseudo-random binary sequence (PRBS) data that is transmitted over the DVI link during a test mode of operation to test the DVI link. The multiplexers select either the digital visual information or the PRBS data. The encoders and serializers do not interfere with the PRBS data transmitted to test the DVI link. The encoders, the serializers, the multiplexers, and the PRBS generator circuit may be fabricated in the same integrated circuit chip according to embodiments of the present invention.

Figure 6:
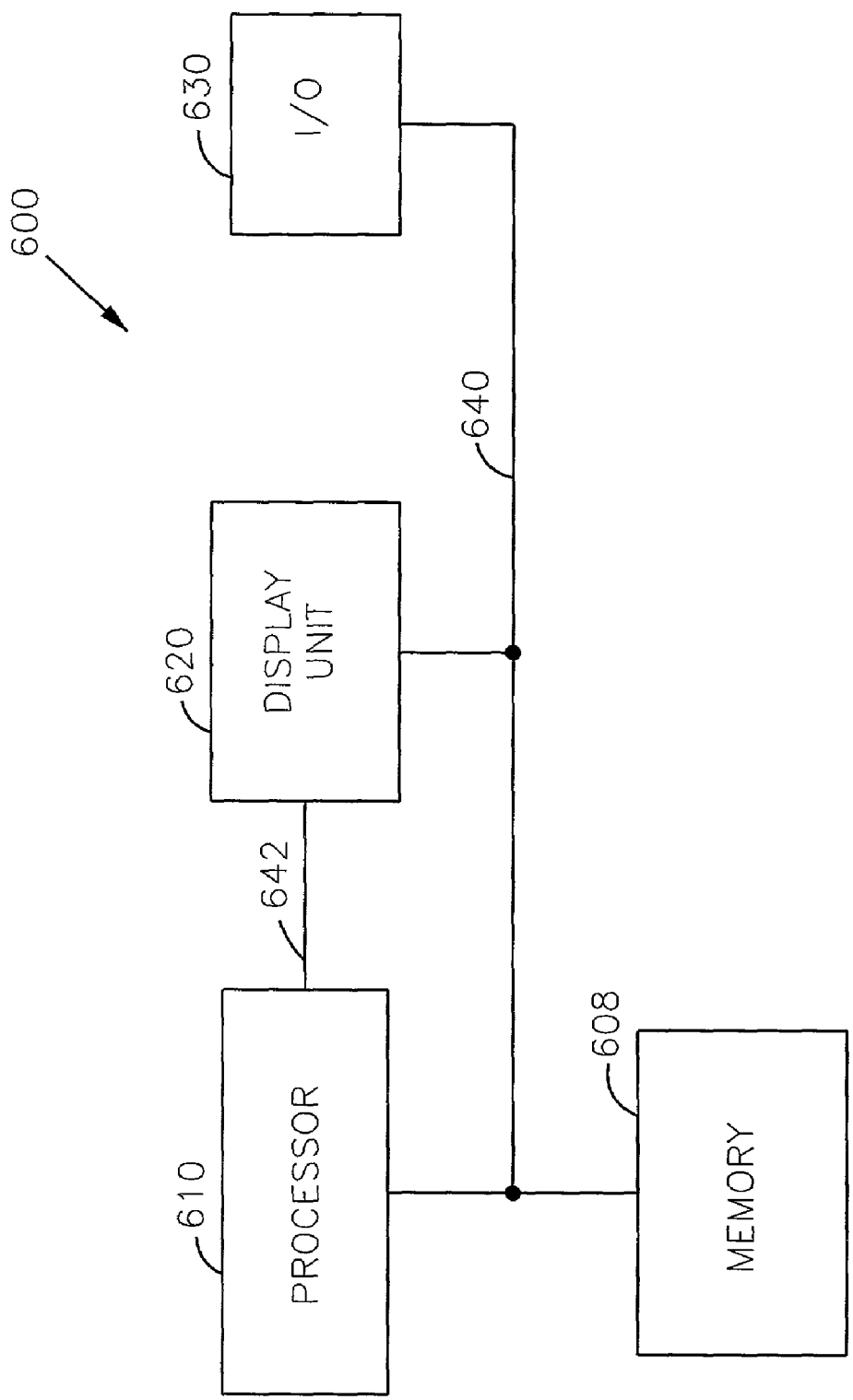
FIG. 6 is a block diagram of an information-handling system according to an embodiment of the present invention.

A block diagram of an information-handling system 600 is shown in FIG. 6 according to an embodiment of the present invention. The information-handling system 600 includes a memory system 608, a processor 610, a display unit 620, and an input/output (I/O) subsystem 630. The processor 610 may be, for example, a microprocessor. The processor 610, the display unit 620, the I/O subsystem 630, and the memory system 608 are coupled together by a suitable communication line or bus 640. The processor 610, the display unit 620, the I/O subsystem 630, and the memory system 608 transmit and/or receive information to and from each other over the bus 640. The information includes data and/or instructions transmitted as signals, or digital signals, over the bus 640. The I/O subsystem 630 may be a keyboard or other device to allow a user to communicate with the system 600. A digital visual interface (DVI) link including one or more of the embodiments of the present invention shown in FIGS. 1–5 and described above may be included in two or more of the processor 610, the display unit 620, the I/O subsystem 630, and the memory system 608, and may be part of the bus 640. In an alternative embodiment of the present invention, a digital visual interface (DVI) link including one or more of the embodiments of the present invention shown in FIGS. 1–5 and described above may be included in the processor 610 and the display unit 620, and may include a separate transmission medium 642 coupled between the processor 610 and the display unit 620.

In various embodiments of the present invention, the display unit 620 is a cathode ray tube (CRT) display, or a flat panel display such as a liquid crystal display (LCD), or a high definition television (HDTV). The display unit 620 may display a visual image generated from digital visual information transmitted over the digital visual interface (DVI) link including one or more of the embodiments of the present invention shown in FIGS. 1–5 and described above.

In various embodiments of the present invention, the information-handling system 600 is a computer system (such as, for example, a video game, a hand-held calculator, a television set-top box, a fixed-screen telephone, a smart mobile phone, a personal digital assistant (PDA), a network computer (NC), a hand-held computer, a workstation, a personal computer, a desktop computer, a laptop computer, or a multiprocessor supercomputer), an information appliance (such as, for example, a cellular telephone, a pager, a daily planner or organizer, or any wireless device), an information component (such as, for example, a magnetic disk drive or telecommunications modem), or other appliance (such as, for example, a hearing aid, washing machine or microwave oven having an electronic controller).

Although specific embodiments have been illustrated and described herein, it will be appreciated by those skilled in the art having the benefit of this description that any equivalent arrangement may be substituted for the specific embodiments shown. The present invention is therefore limited only by the claims and equivalents thereof.

What is claimed is:

1. An information transmission link comprising:
   a transition minimized differential signaling encoder coupled to receive digital data from a plurality of parallel lines to encode the digital data into encoded digital data;
   a serializer coupled to receive the encoded digital data from the encoder through a plurality of parallel lines to serialize the encoded digital data into encoded and serial digital data;
   a pseudo-random binary sequence generator circuit to generate test data;
   a multiplexer coupled to receive the encoded and serial digital data from a first line coupled to the serializer and the test data from a second line coupled to the sequence generator circuit, the multiplexer to transmit the encoded and serial digital data to a transmission medium in a normal mode of operation and being coupled to receive a test signal to put the multiplexer in a test mode of operation to transmit the test data to the transmission medium; and
   wherein the encoder, the serializer, the sequence generator circuit, and the multiplexer are fabricated in a single integrated circuit chip.

2. The information transmission link of claim 1 wherein the information transmission link comprises a digital visual interface link.

3. The information transmission link of claim 1 wherein:
   the digital data comprises digital visual information comprising red data to generate red color in a visual image, green data to generate green color in the visual image, and blue data to generate blue color in the visual image; and
   the transmission medium comprises one or more conductive wires such as copper cables, or one or more optical fibers, or one or more fiber optic cables.

4. The information transmission link of claim 1, further comprising a buffer circuit coupled between the multiplexer and the transmission medium to convert the encoded and serial digital data in the normal mode of operation or the test data in the test mode of operation into a differential signal to be transmitted over a pair of differential lines comprising the transmission medium.

5. The information transmission link of claim 1 wherein:
   the test data comprises pseudo-random binary sequence data that repeats every $2^{23}-1$ clock cycles; and
   the sequence generator circuit comprises:
      twenty three clocked flip flops coupled in series including a first flip flop, twenty one middle flip flops, and a last flip flop, each flip flop comprising a D-type flip flop comprising a D input and a Q output, the Q output of the first flip flop being coupled to the D input of one of the middle flip flops, the D input of the last flip flop being coupled to the Q output of one of the middle flip flops, and the D input of each middle flip flop being coupled to the Q output of one of the flip flops in the sequence generator circuit;
      an exclusive-NOR gate having a first input coupled to the Q output of the last flip flop, a second input coupled to the Q output of a middle flip flop that is separated from the last flip flop by four of the middle flip flops, and an output coupled to the D input of the first flip flop to provide feedback for the sequence generator circuit; and
      an inverter having an input coupled to the Q output of the last flip flop and an output to generate the pseudo-random binary sequence data.

6. A information-handling system of the type including the information transmission link of claim 1, and further comprising:
   a processor including the encoder, the serializer, the sequence generator circuit, and the multiplexer;
   a memory device;
   a display unit having a receiver coupled to receive the encoded and serial digital data to display a visual image generated from the encoded and serial digital data;
   an input/output subsystem; and
   a bus coupled to the processor, the memory device, the display unit, and the input/output subsystem, the bus including the transmission medium.

7. A digital visual interface link comprising:
   a transmitter comprising:
      a transition minimized differential signaling encoder coupled to receive digital data from a plurality of parallel lines to encode the digital data into encoded digital data;

a serializer coupled to receive the encoded digital data from the encoder through a plurality of parallel lines to serialize the encoded digital data into encoded and serial digital data;

a pseudo-random binary sequence generator circuit to generate test data;

a multiplexer coupled to receive the encoded and serial digital data from a first line coupled to the serializer and the test data from a second line coupled to the sequence generator circuit, the multiplexer to transmit the encoded and serial digital data in a normal mode of operation and being coupled to receive a test signal to put the multiplexer in a test mode of operation to transmit the test data; and wherein the encoder, the serializer, the sequence generator circuit, and the multiplexer are fabricated in a single integrated circuit chip;

a transmission medium coupled to the transmitter to transmit the encoded and serial digital data in the normal mode of operation and to transmit the test data in the test mode of operation; and a receiver comprising:

a deserializer coupled to receive the encoded and serial digital data from the transmission medium to deserialize the encoded and serial digital data into encoded digital data on a plurality of parallel lines; and a transition minimized differential signaling decoder coupled to receive the encoded digital data from the parallel lines to decode the encoded digital data into digital data.

8. The digital visual interface link of claim 7 wherein:

the digital data comprises digital visual information comprising red data to generate red color in a visual image, green data to generate green color in the visual image, and blue data to generate blue color in the visual image;

the transmission medium comprises one or more conductive wires such as copper cables, or one or more optical fibers, or one or more fiber optic cables; and the receiver further comprises external terminals to be coupled to a bit error rate test set device to couple the test data transmitted over the transmission medium in the test mode of operation to the bit error rate test set device to analyze the test data and determine if there was any corruption of the test data.

9. The digital visual interface link of claim 7, further comprising a buffer circuit coupled between the multiplexer and the transmission medium to convert the encoded and serial digital data in the normal mode of operation or the test data in the test mode of operation into a differential signal to be transmitted over a pair of differential lines comprising the transmission medium.

10. The digital visual interface link of claim 7 wherein:

the test data comprises pseudo-random binary sequence data that repeats every $2^{23}-1$ clock cycles; and the sequence generator circuit comprises:

twenty three clocked flip flops coupled in series including a first flip flop, twenty one middle flip flops, and a last flip flop, each flip flop comprising a D-type flip flop comprising a D input and a Q output, the Q output of the first flip flop being coupled to the D input of one of the middle flip flops, the D input of the last flip flop being coupled to the Q output of one of the middle flip flops, and the D input of each middle flip flop being coupled to the Q output of one of the flip flops in the sequence generator circuit;

an exclusive-NOR gate having a first input coupled to the Q output of the last flip flop, a second input coupled to the Q output of a middle flip flop that is separated from the last flip flop by four of the middle flip flops, and an output coupled to the D input of the first flip flop to provide feedback for the sequence generator circuit; and an inverter having an input coupled to the Q output of the last flip flop and an output to generate the pseudo-random binary sequence data.

11. A information-handling system of the type including the digital visual interface link of claim 7, and further comprising:

a processor including the encoder, the serializer, the sequence generator circuit, and the multiplexer;

a display unit including the receiver;

a memory device;

an input/output subsystem; and a bus coupled to the processor, the memory device, the display unit, and the input/output subsystem, the bus including the transmission medium.

12. An information-handling system comprising:

a digital visual interface link comprising a transmitter, a receiver, and a transmission medium coupled between the transmitter and the receiver to transmit digital visual information;

a processor including the transmitter;

a display unit including the receiver;

an input/output subsystem;

a memory device;

a bus coupled to the processor, the memory device, the display unit, and the input/output subsystem; and wherein:

the transmitter comprises:

a transition minimized differential signaling encoder coupled to receive digital data from a plurality of parallel lines to encode the digital data into encoded digital data;

a serializer coupled to receive the encoded digital data from the encoder through a plurality of parallel lines to serialize the encoded digital data into encoded and serial digital data;

a pseudo-random binary sequence generator circuit to generate test data;

a multiplexer coupled to receive the encoded and serial digital data from a first line coupled to the serializer and the test data from a second line coupled to the sequence generator circuit, the multiplexer to transmit the encoded and serial digital data to the transmission medium in a normal mode of operation and being coupled to receive a test signal to put the multiplexer in a test mode of operation to transmit the test data to the transmission medium; and wherein the encoder, the serializer, the sequence generator circuit, and the multiplexer are fabricated in a single integrated circuit chip; and the receiver comprises:

a deserializer coupled to receive the encoded and serial digital data from the transmission medium to deserialize the encoded and serial digital data into encoded digital data on a plurality of parallel lines; and a transition minimized differential signaling decoder coupled to receive the encoded digital data from the parallel lines to decode the encoded digital data into digital data.

13. The information-handling system of claim 12 wherein:
the digital data comprises digital visual information comprising red data to generate red color in a visual image, green data to generate green color in the visual image, and blue data to generate blue color in the visual image;
the transmission medium comprises one or more conductive wires such as copper cables, or one or more optical fibers, or one or more fiber optic cables; and
the receiver further comprises external terminals to be coupled to a bit error rate test set device to couple the test data transmitted over the transmission medium in the test mode of operation to the bit error rate test set device to analyze the test data and determine if there was any corruption of the test data.

14. The information-handling system of claim 12, further comprising a buffer circuit coupled between the multiplexer and the transmission medium to convert the encoded and serial digital data in the normal mode of operation or the test data in the test mode of operation into a differential signal to be transmitted over a pair of differential lines comprising the transmission medium.

15. The information-handling system of claim 12 wherein:
the test data comprises pseudo-random binary sequence data that repeats every $2^{23}-1$ clock cycles; and
the sequence generator circuit comprises:
twenty three clocked flip flops coupled in series including a first flip flop, twenty one middle flip flops, and a last flip flop, each flip flop comprising a D-type flip flop comprising a D input and a Q output, the Q output of the first flip flop being coupled to the D input of one of the middle flip flops, the D input of the last flip flop being coupled to the Q output of one of the middle flip flops, and the D input of each middle flip flop being coupled to the Q output of one of the flip flops in the sequence generator circuit;
an exclusive-NOR gate having a first input coupled to the Q output of the last flip flop, a second input coupled to the Q output of a middle flip flop that is separated from the last flip flop by four of the middle flip flops, and an output coupled to the D input of the first flip flop to provide feedback for the sequence generator circuit; and
an inverter having an input coupled to the Q output of the last flip flop and an output to generate the pseudo-random binary sequence data.

16. A method of transmitting data through a link comprising:
encoding digital data into encoded digital data in a transition minimized differential signaling encoder;
serializing the encoded digital data into encoded and serial digital data in a serializer;
generating test data in a pseudo-random binary sequence generator circuit; and
transmitting the encoded and serial digital data through a multiplexer to a transmission medium in a normal mode of operation and transmitting the test data through the multiplexer to the transmission medium in a test mode of operation selected by a test signal coupled to the multiplexer, the multiplexer being fabricated with the encoder, the serializer, and the sequence generator circuit in a single integrated circuit chip.

17. The method of claim 16 wherein encoding digital data further comprises encoding digital data comprising red data to generate red color in a visual image, green data to generate green color in the visual image, and blue data to generate blue color in the visual image.

18. The method of claim 16 wherein transmitting the encoded and serial digital data further comprises transmitting the encoded and serial digital data through the multiplexer to one or more conductive wires such as copper cables, or one or more optical fibers, or one or more fiber optic cables comprising the transmission medium.

19. The method of claim 16, further comprising converting the encoded and serial digital data or the test data transmitted through the multiplexer into a differential signal in a buffer circuit to be transmitted over a pair of differential lines comprising the transmission medium.

20. The method of claim 16 wherein generating test data further comprises generating pseudo-random binary sequence data that repeats every $2^{23}-1$ clock cycles in a pseudo-random binary sequence generator circuit comprising twenty three clocked flip flops coupled in series.

21. The method of claim 16, further comprising receiving and analyzing the test data transmitted over the transmission medium in the test mode of operation in a bit error rate test set device to determine if there was any corruption of the test data.

22. The method of claim 16 wherein:
encoding digital data further comprises encoding the digital data in a processor including the encoder, the serializer, the sequence generator circuit, and the multiplexer, the processor being coupled to a display unit, a memory device, and an input/output subsystem through a bus in an information-handling system; and
further comprising:
exchanging signals comprising data or instructions over the bus between the processor, the display unit, the memory device, and the input/output subsystem; and
receiving, deserializing, decoding, and displaying the encoded and serial digital data in the display unit.

* * * * *